(12) United States Patent
Dharmar et al.

(10) Patent No.: US 11,651,467 B2
(45) Date of Patent: May 16, 2023

(54) NETWORK BASED PROVISION OF RENDERING AND HOSTING SYSTEMS

(71) Applicant: YAHOO ASSETS LLC, Dulles, VA (US)

(72) Inventors: Venkatesh Dharmar, Sunnyvale, CA (US); Edward Joseph Campbell, San Jose, CA (US); Daniel Haight, Foster City, CA (US)

(73) Assignee: YAHOO ASSETS LLC, New York, NY (US)

( * ) Notice: Subject to any disclaimer, the term of this patent is extended or adjusted under 35 U.S.C. 154(b) by 480 days.

(21) Appl. No.: 16/728,010

(22) Filed: Dec. 27, 2019

(65) Prior Publication Data

US 2021/0118083 A1    Apr. 22, 2021

Related U.S. Application Data

(60) Provisional application No. 62/924,172, filed on Oct. 21, 2019.

(51) Int. Cl.
| | |
|---|---|
| *G06Q 50/34* | (2012.01) |
| *G06Q 20/36* | (2012.01) |
| *H04L 67/306* | (2022.01) |
| *H04L 67/02* | (2022.01) |

(52) U.S. Cl.
CPC ............ *G06Q 50/34* (2013.01); *G06Q 20/36* (2013.01); *H04L 67/02* (2013.01); *H04L 67/306* (2013.01)

(58) Field of Classification Search
CPC ................................ G06Q 30/0207–30/0277
USPC ................................................... 705/14, 319
See application file for complete search history.

(56) References Cited

U.S. PATENT DOCUMENTS

| | | | | |
|---|---|---|---|---|
| 7,857,207 B1* | 12/2010 | Hopkins, III | ......... | G07F 19/201 221/9 |
| 2009/0131146 A1* | 5/2009 | Arezina | ................. | G07F 17/32 463/20 |
| 2015/0339654 A1* | 11/2015 | Warner | ............... | G07F 17/3248 463/25 |
| 2016/0027252 A1* | 1/2016 | Warner | ............... | G07F 17/3244 463/25 |
| 2020/0265684 A1* | 8/2020 | Hufnagl-Abraham | ....................... | G07F 17/3267 |

* cited by examiner

*Primary Examiner* — Matthew T Sittner
*Assistant Examiner* — Richard G Reinhardt
(74) *Attorney, Agent, or Firm* — James J. DeCarlo; Greenberg Traurig, LLP (57) ABSTRACT

Improved systems and methods for enhancing the performance of network based computerized content rendering and hosting and providing of devices, systems and/or platforms by modifying the capabilities and providing non-native functionality to such devices, systems and/or platforms through a novel and improved data processing and networking framework.

17 Claims, 7 Drawing Sheets

NETWORK BASED PROVISION OF RENDERING AND HOSTING SYSTEMS

CROSS-REFERENCE TO RELATED APPLICATIONS

This application claims the benefit of U.S. Provisional Application No. 62/924,172, filed Oct. 21, 2019, titled "Integrated Bet Slip for Affiliates", which is incorporated by reference herein in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of network based computerized content rendering and hosting and providing of devices, systems and/or platforms by modifying the capabilities and providing non-native functionality to such devices, systems and/or platforms through a novel and improved data processing and networking framework.

BACKGROUND

Computing devices running native software or web browsers can utilize a computer network to offload content rendering and data processing to remote computing devices. Such devices can also retrieve data and content from remote devices via a computer network. One way of offloading content rending and data processing is via use of a web browser that can access web services over a computer network such as the Internet.

With the use of a computer network for offloading content rendering and data processing there are setbacks and tradeoffs. For example, network performance in a computer network can be limited by its bandwidth as well as network delay, quality of service issues, network congestion, and network resilience issues. Also, using a computer network for offloading content rendering and data processing adds network security concerns and consideration of use of data encryption which can burden additional computer resources.

SUMMARY

In general, described herein are improved systems and methods for enhancing the performance of network based computerized content rendering and hosting and providing of devices, systems and/or platforms by modifying the capabilities and providing non-native functionality to such devices, systems and/or platforms through a novel and improved data processing and networking framework.

In some embodiments described herein, the systems and methods can overcome at least the technical problems mentioned in the background section above and other parts of the present disclosure as well as other technical problems not described herein but recognized by those skilled in the art. In general, described herein are improved systems and methods that solve such technical problems by enhancing the performance of network based computerized content rendering and hosting and providing of devices, systems and/or platforms through a novel and improved data processing and networking framework. In general, the improved data processing and networking framework can include an affiliate website or native application that can provide front-end content rendering and data processing functionality for a user of the website or native application. And, by being communicatively coupled to the affiliate website or native application (such as via links and/or functions in HTML iframes or in webviews of a native app), one or more servers of an operator can provide back-end content rendering and data processing functionality for the user of the website or native application.

In some embodiments, for the affiliate application, at least iframes can be used within a website or webpage to implement modifying the capabilities and providing non-native functionality to devices, systems and/or platforms described herein. In some other embodiments, for the affiliate application, at least webviews within a native application (such as a native mobile application) can be used to implement modifying the capabilities and providing non-native functionality to devices, systems and/or platforms described herein. In other words, webviews can be used as an alternative to iframes inside native apps. Iframes can be used to support the affiliate component via a web browser. The information that is provided into the iframe or webview depending on the implementation can be information that the affiliate has already inferred, received, or retrieved from a user.

In some embodiments, for the affiliate app or website, the data accumulating from populating fields and clicks and other types of interactions by users over time allows the affiliate to build machine learning models that can more easily predict what content rendering and data processing customers are going to request.

In accordance with one or more embodiments, this disclosure provides computerized methods for enhancing the performance of network based computerized content rendering and hosting and providing of devices, systems and/or platforms, as well as a non-transitory computer-readable storage medium for carrying out technical steps of the computerized methods. The non-transitory computer-readable storage medium has tangibly stored thereon, or tangibly encoded thereon, computer readable instructions that when executed by one or more devices (e.g., one or more servers) cause at least one processor to perform a method for a novel and improved technology for enhancing the performance of network based computerized content rendering and hosting and providing of devices, systems and/or platforms.

In accordance with one or more embodiments, a system is provided that includes one or more computing devices configured to provide functionality in accordance with one or more embodiments of a novel and improved way of enhancing the performance of network based computerized content rendering and hosting and providing of devices, systems and/or platforms.

In accordance with one or more embodiments, functionality is embodied in steps of a method performed by at least one computing device. In accordance with one or more embodiments, program code (or program logic) executed by processor(s) of a computing device to implement functionality in accordance with one or more embodiments described herein is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DESCRIPTION OF EMBODIMENTS

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium can include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers can vary widely in configuration or capabilities, but generally a server can include one or more central processing units and memory. A server can also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that can couple devices so that communications can be exchanged, such as between a server and a client device or other types of devices, including between wireless devices coupled via a wireless network, for example. A network can also include mass storage, such as network attached storage (NAS), a storage area network (SAN), or other forms of computer or machine-readable media, for example. A network can include the Internet, one or more local area networks (LANs), one or more wide area networks (WANs), wire-line type connections, wireless type connections, cellular or any combination thereof. Likewise, sub-networks, which can employ differing architectures or can be compliant or compatible with differing protocols, can interoperate within a larger network. Various types of devices can, for example, be made available to provide an interoperable capability for differing architectures or protocols. As one illustrative example, a router can provide a link between otherwise separate and independent LANs.

A communication link or channel can include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as can be known to those skilled in the art. Furthermore, a computing device or other related electronic devices can be remotely coupled to a network, such as via a wired or wireless line or link, for example.

A computing device can be capable of sending or receiving signals, such as via a wired or wireless network, or can be capable of processing or storing signals, such as in memory as physical memory states, and can, therefore, operate as a server. Thus, devices capable of operating as a server can include, as examples, dedicated rack mounted servers, desktop computers, laptop computers, set top boxes, integrated devices combining various features, such as two or more features of the foregoing devices, or the like. Servers can vary widely in configuration or capabilities, but generally a server can include one or more central processing units and memory. A server can also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client device can include a computing device capable of sending or receiving signals, such as via a wired or a wireless network. A client device can, for example, include a desktop computer or a portable device, such as a cellular telephone, a smart phone, a display pager, a radio frequency (RF) device, an infrared (IR) device, an NFC device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device can vary in terms of capabilities or features. Claimed subject matter is intended to cover a wide range of potential variations. For example, a simple smart phone, phablet or tablet can include a numeric keypad or a display of limited functionality, such as a monochrome liquid crystal display (LCD) for displaying text. In contrast, however, as another example, a web-enabled client device can include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device can include or can execute a variety of operating systems, including a personal computer operating system, such as a Windows, iOS or Linux, or a mobile operating system, such as iOS, Android, or Windows Mobile, or the like.

A client device can include or can execute a variety of possible applications, such as a client software application enabling communication with other devices, such as communicating one or more messages, such as via email, for example Yahoo! ® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device can also include or execute an application to communicate content, such as, for example, textual content, multimedia content, or the like. A client device can also include or execute an application to perform a variety of possible tasks, such as browsing, searching, playing, streaming or displaying various forms of content, including locally stored or uploaded images and/or video, or games (such as fantasy sports leagues). The foregoing is provided to illustrate that claimed subject matter is intended to include a wide range of possible features or capabilities.

Also, for the purposes of this disclosure the term "app" should be understood to refer to an application, such as an application that can be executed on a computing device.

There are many technical problems with a conventional affiliate workflow. For example, current restrictions from many state regulators will not allow users to bet outside the applications or websites provided by operators (such as sports betting operators). The known affiliates at present redirect the users from their app or website to the operator's flow. By the redirection, an affiliate can lose control of the user in a partner page and the user experience is not seamless.

With an integrated bet slip and environment, such as the ones described herein, the user can register, deposit and place bets inside an embedded iframe within an affiliate's app or web site. With such an approach, a user is not redirected to remote pages of the operator. The user registration, verification, deposit and place bet actions happen within the app or website (or server) of the operator, but such things are initiated via the affiliate's app or website.

In some embodiments, the affiliate app (which can be a native app or a website, for example) can include a single sign on. This means that the user signs in once for the affiliate app and the components of the operator as well. This can be implemented via one or more information workflows such as the OpenID workflow or one or more parts of the OpenID workflow. Such workflow(s) can connect and facilitate the communications and negotiations between the affiliate app and the back-end transactional component of the operator. For example, account data, bets, authentication, and the like can be communicated through such workflow (s).

In some embodiments, the affiliate app can include an electronic wallet. The affiliate app can have active wallet which is used to fund bets. The workflow used for the affiliate app can be migrated and/or integrated into the back-end transactional component of the operator so that funds can be managed by the operator as well.

In some embodiments, the overall system can include geographical checks, such as via GPS in a device used by the user for betting.

One of the major restrictions on online sportsbook is with geographical checks. Geographical checks can be used to enforce state borders and regulations. A geo check application can be integrated in parts of the affiliate app and/or the operator's backend component to prevent a user from placing bets that violate state regulations. This occurs because the geo check can monitor the location of the user to determine whether the user is in the appropriate location for making a bet.

In short, examples of the systems and methods disclosed herein for integrating sports betting slips and environments for affiliates provide specific technical solutions to at least overcome the technical problems mentioned in the background section and other parts of the application as well as other technical problems not described herein but recognized by those skilled in the art.

Figure 1:
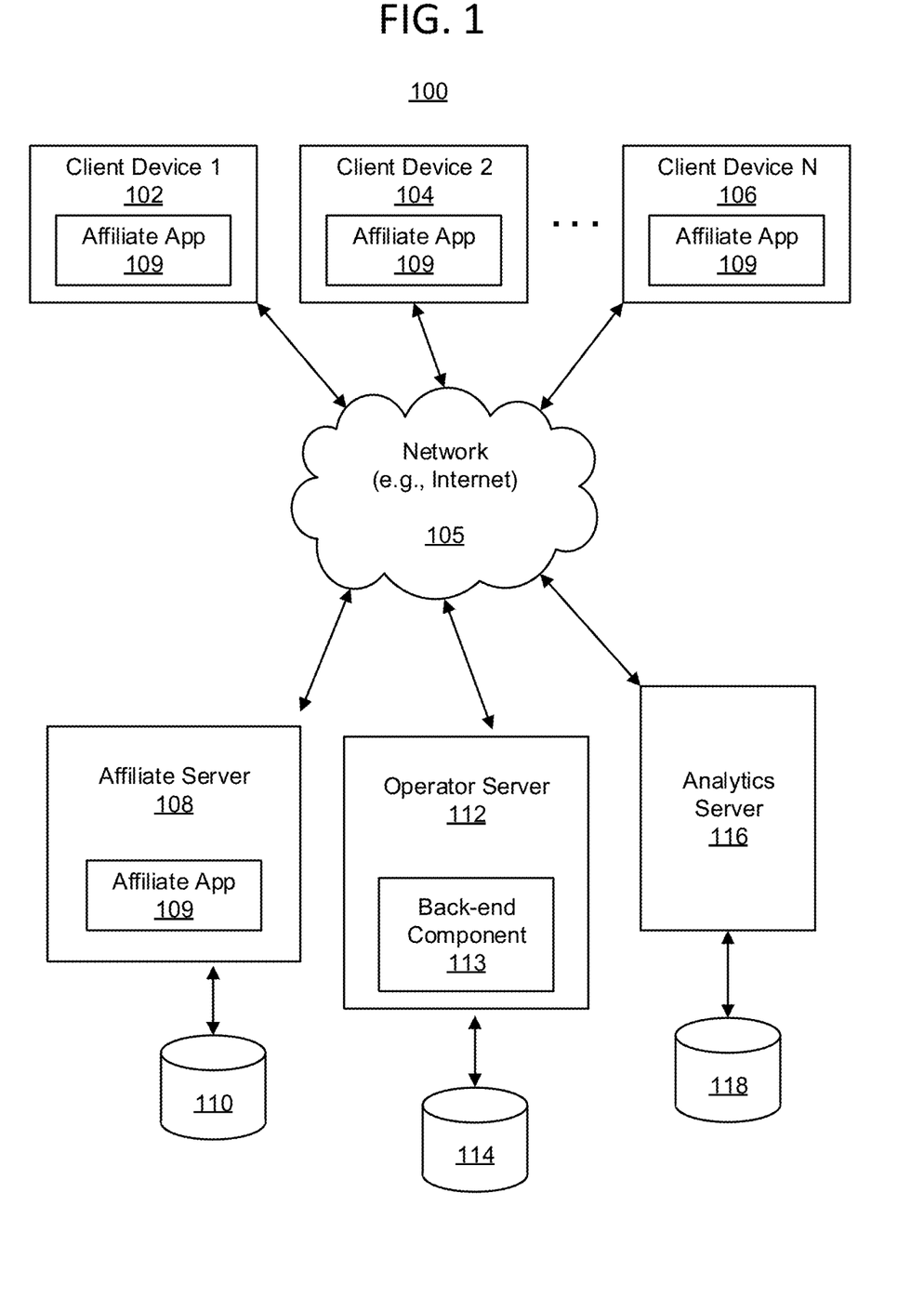
FIG. 1 is a schematic diagram illustrating an example of a system within which systems and methods disclosed herein can be implemented according to some embodiments of the present disclosure.

Certain embodiments will now be described in greater detail with reference to the FIGS. 1-6. In general, with reference to FIG. 1, a system 100 in accordance with an embodiment of the present disclosure is shown. FIG. 1 shows components of a general environment in which the systems and methods discussed herein can be practiced. Not all the components can be required to practice the disclosure, and variations in the arrangement and type of the components can be made without departing from the spirit or scope of the disclosure. As shown, system 100 of FIG. 1 includes local area networks ("LANs")/wide area networks ("WANs")—network 105, client devices (e.g., see client devices 102, 104, and 106), an affiliate server 108, an operator server 112, and an analytics server 116. Applications used by the client devices can be served by the servers illustrated in FIG. 1, and such applications can include an affiliate application 109 which can be served at least in part from the affiliate server 108.

In some embodiments, the affiliate application 109 or any of the affiliate apps or websites described herein can be connected to, be a part of, or include a fantasy sports app or website (such as a fantasy football app or website). In such embodiments, the fantasy sports app or website can be a part of or owned by the affiliate.

Example systems and methods disclosed herein can solve the problems disclosed through the affiliate application 109 (which can be or include or be a part of an affiliate sports betting website). The affiliate application 109 can provide a front-end registration, an electronic wallet, and a betting environment for the user. And, by being communicatively coupled to the affiliate application 109 (such as via links and/or functions in HTML iframes or in webviews of a native app), one or more servers of a sports betting operator (e.g., see operator server 112) can register users, maintain funds in appropriate accounts, and provide the sports betting transactions. The affiliate application can be provided by server(s) of the affiliate and/or the operator (e.g., see affiliate server 108).

FIG. 1 shows the affiliate server 108 providing the affiliate application 109 to the client devices 102, 104, and 106. And, the back-end transactional component 113 is provided by the operator server 112. The back-end transactional component 113 can be provided through the affiliate application 109. Although, in such embodiments, the affiliate application 109 and the back-end transactional component 113 are separate applications being served from separate servers.

As shown, the affiliate server 108 is communicatively coupled to database 110 and uses the database 110 for data storage, retrieval, and management. The operator server 112 is communicatively coupled to database 114 and uses the database 114 for data storage, retrieval, and management. The analytics server 116 is communicatively coupled to database 118 and uses the database 118 for data storage, retrieval, and management. The databases described herein can be used by the servers to select, store and organize data used as input for the processes described herein. For example, information described herein can be from one or more of the databases described herein. The servers and client devices described herein can select and use the data stored and organized in the databases as input for data processing and management tasks described herein.

It is to be understood that processes described herein can be executed by one or more of the client devices or servers disclosed herein. For example, each of the client devices include a configuration to perform at least some of the operations of method 500 depicted in FIG. 5. And, specifically, for example, at least the operator server 112 includes a configuration to perform at least some of the operations of method 600 depicted in FIG. 6. Example embodiments of the client device and servers shown in FIG. 1 as well as the network 105 are described in more detail below.

Client devices (e.g., see client devices 102, 104, and 106) can include a computing device capable of receiving and sending a message over a network, such as network 105—which can include a wireless network—, or the like. Client devices can also be mobile devices that are configured to be portable and held in a hand or two hands. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices typically range widely in terms of capabilities and features. For example, a cell phone can have a numeric keypad and a few lines of monochrome LCD display on which only text can be displayed. In another example, a web-enabled mobile device can have a touch sensitive screen, a stylus, and an HD display in which both text and graphics can be displayed.

A web-enabled client device can include a browser application that is configured to receive and to send web pages, web-based messages, and the like. The browser application can be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Client devices (e.g., see client devices 102, 104, and 106) and servers (e.g., see servers 108, 112, and 116) can each include at least one client application (such as the affiliate application 109 or a part of the affiliate application or such as a part of the back-end transactional component 113) that is configured to receive content or data from another computing device. The client application (e.g., the affiliate application 109 or a part of the back-end transactional component 113) can include a capability to provide and receive textual content, graphical content, audio content, authentication and keying information, and the like. The client application can further provide information that identifies itself, including a type, capability, name, and the like. In one embodiment, client devices and servers can each uniquely identify themselves through any of a variety of mechanisms. Client devices can be identifiable via a phone number, Mobile Identification Number (MIN), an electronic serial number (ESN), or another type of device identifier. Servers, clusters, and computers within clusters can be identifiable via an electronic serial number (ESN) or another type of device identifier.

In general, client devices and servers (e.g., see the client devices and servers shown in FIG. 1) can be capable of sending or receiving signals, such as via a wired or wireless network, or can be capable of processing or storing signals, such as in memory as physical memory states.

Network 105 is configured to couple client devices and servers (e.g., see the client devices and servers shown in FIG. 1) with other computing devices. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, can be compatible with or compliant with one or more protocols. Signaling formats or protocols employed can include, for example, TCP/IP, UDP, QUIC (Quick UDP Internet Connection), DECnet, NetBEUI, IPX, APPLETALK™, or the like. Versions of the Internet Protocol (IP) can include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets can be communicated between nodes of a network, such as, for example, to one or more sites employing a local network address. A signal packet can, for example, be communicated over the Internet from a user site via an access node coupled to the Internet. Likewise, a signal packet can be forwarded via network nodes to a target site coupled to the network via a network access node, for example. A signal packet communicated via the Internet can, for example, be routed via a path of switches, gateways, servers, etc. that can route the signal packet in accordance with a target address and availability of a network path to the target address.

In some embodiments, the network 105 can include content distribution network(s) and/or application distribution network(s). A content distribution network (CDN) or an application distribution network (ADN) generally refers to a delivery system that includes a collection of computers or computing devices linked by a network or networks. A CDN or ADN can employ software, systems, protocols or techniques to facilitate various services, such as storage, caching, communication of content, or streaming media or applications included, associated with, or used by the enhanced GUI generator.

Generally, the client devices and servers shown in FIG. 1 include a computing system or device that includes a configuration to provide content such as interactive content via a network to another device. Devices that can operate as such server(s) include personal computers desktop computers, multiprocessor systems, microprocessor-based or programmable consumer electronics, network PCs, servers, and the like. The client devices and servers shown in FIG. 1 can provide a variety of additional services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services can be used by a user upon the user being authenticated, verified or identified by the service. Examples of content can include videos, text, audio, images, or the like, which can be processed in the form of physical signals, such as electrical signals, for example, or can be stored in memory, as physical states, for example.

The client devices and servers shown in FIG. 1 can be capable of sending or receiving signals, such as via a wired or wireless network, or can be capable of processing or storing signals, such as in memory as physical memory states. Devices capable of operating as a server can include, as examples, dedicated rack-mounted servers or computers, desktop computers, laptop computers, set top boxes, integrated devices combining various features, such as two or more features of the foregoing devices, or the like. Servers as well computers of clusters can vary widely in configuration or capabilities, but generally, a server can include one or more central processing units and memory. A server or a computer of a cluster can also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers (e.g., see the servers shown in FIG. 1) and such servers can store various types of applications and application related information including application data and user profile information (e.g., identifying and behavioral information associated with a user). It should also be understood that the servers can also store various types of data related to content and services provided by an associated database.

Embodiments exist where the network 105 is also coupled with/connected to a Trusted Search Server (TSS) which can be utilized to render content/data/information in accordance with the embodiments discussed herein. Embodiments exist where the TSS functionality can be embodied within the servers 108, 112, and 116 as well as the computers of network 105.

Moreover, although FIG. 1 illustrates servers 108, 112, and 116 as single computing devices, respectively, the disclosure is not so limited. For example, one or more functions of servers 108, 112, and 116 can be distributed across one or more distinct computing devices. Moreover, in one embodiment, servers 108, 112, and 116 can be integrated into a single computing device, without departing from the scope of the present disclosure.

And, in some embodiments, the analytics server 116 can include analytics based on artificial intelligence (AI) and/or machine learning. For example, the analytics can include or be based on an artificial neural network (ANN). In such embodiments, for the affiliate app or website, the data accumulating from populating fields and clicks and other types of interactions by users over time allows the affiliate to build machine learning models that can more easily predict what bets customers are going to want to make, and to recalculate odds independent of the betting services in real-time so that the affiliate can assist customers in identifying which bets are undervalued or overvalued, which bets they prefer, etc. Such functionality can be implemented via the analytics server 116 and database 118.

Figure 2:
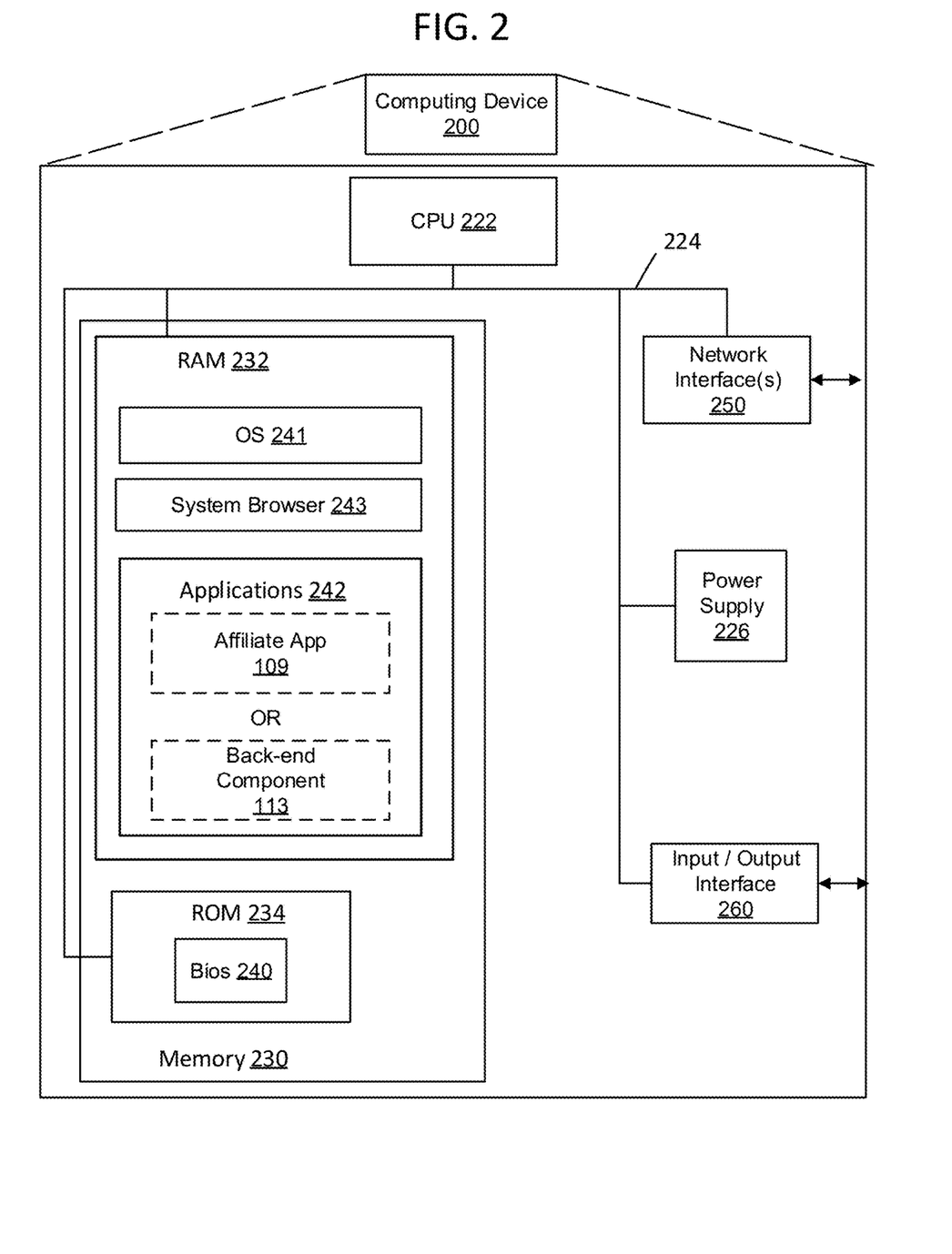
FIG. 2 is a schematic diagram illustrating an example of a computing device, in accordance with some embodiments of the present disclosure.

FIG. 2 is a schematic diagram illustrating a computing device 200 showing an example embodiment of a computing device that can be used within the present disclosure. The computing device 200 can include many more or less components than those shown in FIG. 2. However, the components shown are sufficient to disclose an illustrative embodiment for implementing some aspects the present disclosure. The computing device can represent, for example, any one or more of the servers or client devices discussed above in relation to FIG. 1.

As shown in the figure, computing device 200 includes a processing unit (CPU) 222 in communication with a mass memory 230 via a bus 224. Computing device 200 also includes a power supply 226, one or more network interfaces 250, and an input/output interface 260 (which can include an audio interface, a display, a keypad, an illuminator, a global positioning systems (GPS) receiver, sensors, and an input/output interface to such devices).

Power supply 226 provides power to computing device 200. A rechargeable or non-rechargeable battery can be used to provide power. The power can also be provided by an external power source, such as an AC adapter or a powered docking cradle that supplements and/or recharges a battery. Computing device 200 can optionally communicate with a base station (not shown), or directly with another computing device. Network interface 250 includes circuitry for coupling computing device 200 to one or more networks, and is constructed for use with one or more communication protocols and technologies as discussed above. Network interface 250 is sometimes known as a transceiver, transceiving device, or network interface card (NIC). The input/output interface 260 can be used for communicating with external devices. Input/output interface 260 can utilize one or more communication technologies, such as USB, infrared, Bluetooth™, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of computing device 200. The mass memory also stores an operating system 241 in RAM 232 for controlling the operation of computing device 200. It will be appreciated that this component can include a general-purpose operating system such as a version of UNIX, or LINUX™, or a specialized client communication operating system such as Windows Client™, or the Symbian® operating system. The operating system can include, or interface with a Java virtual machine module that enables control of hardware components and/or operating system operations via Java application programs.

The mass memory also stores a system browser in RAM 232 for controlling operations of a system browser 243 and applications 242, such as the affiliate application 109 or the back-end transactional component 113 shown in FIG. 1.

Memory 230 further includes one or more data stores, which can be utilized by computing device 200 to store, among other things, the system browser 243, the applications 242 and/or other data. For example, data stores can be employed to store information that describes various capabilities of computing device 200. The information can then be provided to another device based on any of a variety of events, including being sent as part of a header during a communication, sent upon request, or the like. At least a portion of the capability information can also be stored on a disk drive or other storage medium (not shown) within computing device 200.

Applications 242 can include computer executable instructions which, when executed by computing device 200 or any of the other servers described herein, transmit, receive, and/or otherwise process text, audio, video, images, and enable telecommunication with other servers and/or another user of another client device. Examples of application programs or "apps" in some embodiments include browsers, calendars, contact managers, task managers, transcoders, photo management, database programs, word processing programs, security applications, spreadsheet programs, games, search programs, and so forth.

Figure 5:
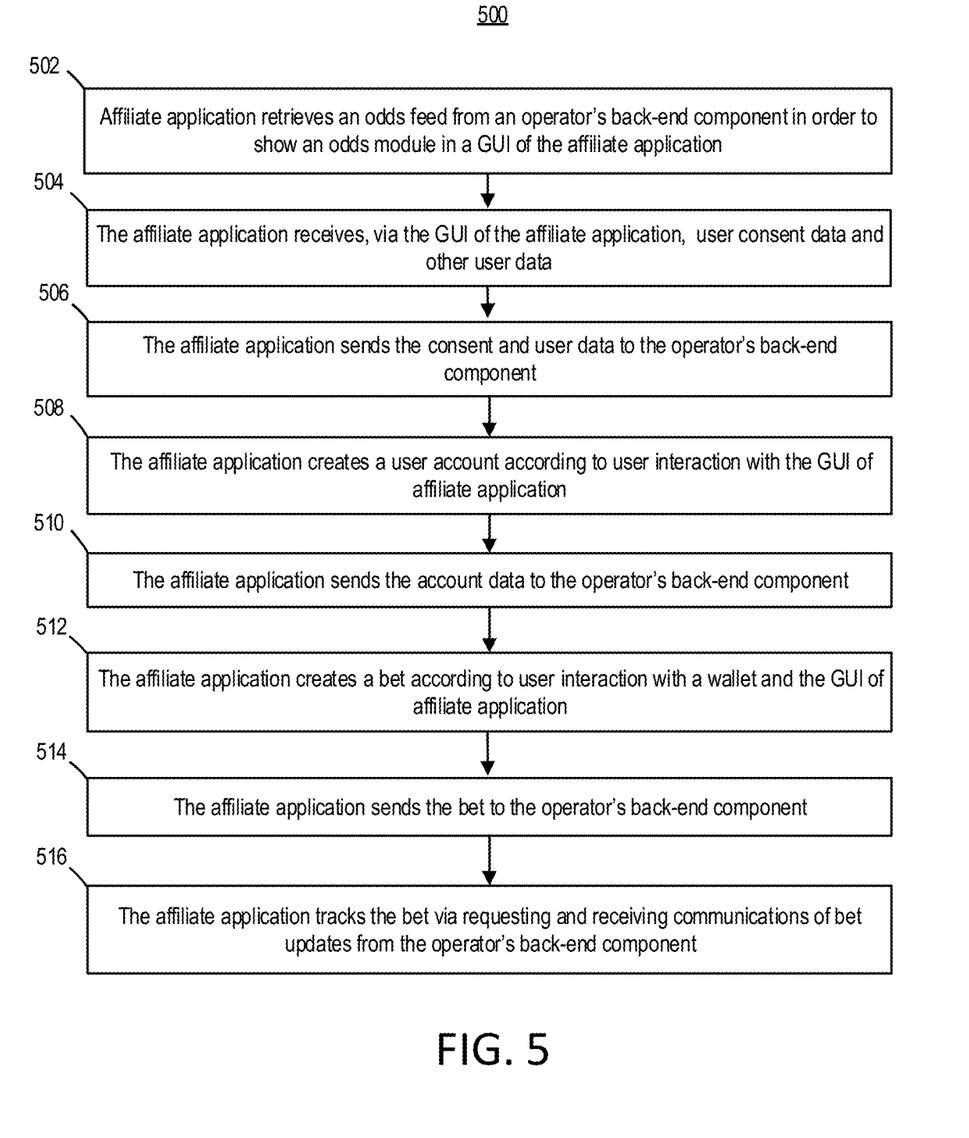

In some embodiments, the computing device 200 can be one of the client devices shown in FIG. 1 or the affiliate server 108 shown in FIG. 1 and can include a processor and a non-transitory computer-readable storage medium for tangibly storing thereon program logic (e.g., see the affiliate app 109) for execution by the processor, the program logic having executable logic for performing the steps of method 500. For example, the program logic and/or the affiliate app 109 can have executable logic for retrieving and/or receiving an odds feed from the operator's back-end transactional component in order to show the odds module in the affiliate's app's graphical user interface (GUI). The program logic and/or the affiliate app 109 can have executable logic for receiving user consent and other user data, via the GUI of the affiliate app, to communicate the consent and other user data to the operator's back-end transactional component. The program logic and/or the affiliate app 109 can have executable logic for generating a user account via user interaction with the GUI of the affiliate app, to communicate the account data to the operator's back-end transactional component. The program logic and/or the affiliate app 109 can have executable logic for generating a bet according to user interaction with an electronic wallet and the GUI of the affiliate app, to communicate the bet to the operator's back-end transactional component. The program logic and/or the affiliate app 109 can have executable logic for tracking the bet via requesting and receiving communications of bet updates from the operator's back-end transactional component.

Figure 6:
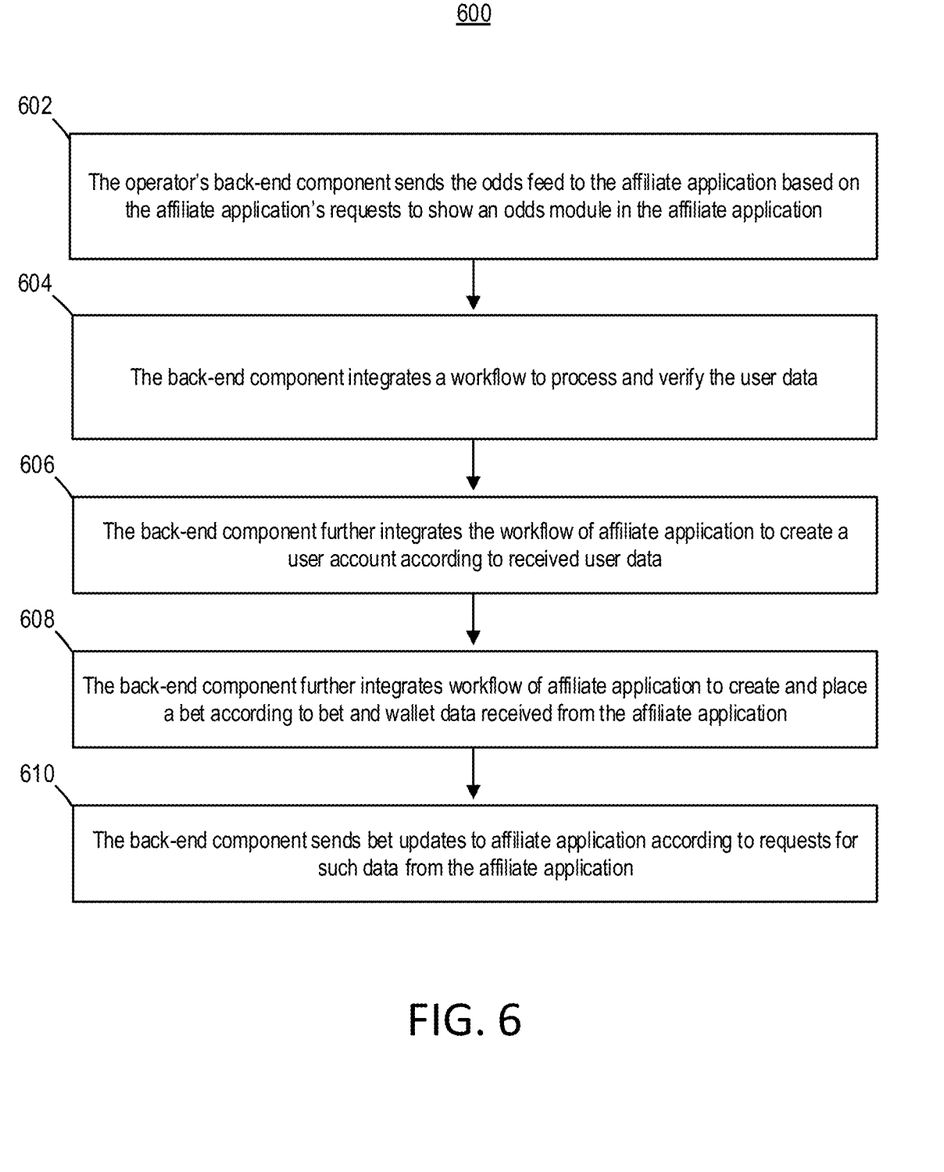

In some embodiments, the computing device 200 can be at least the operator server 112 shown in FIG. 1 and can include a processor and a non-transitory computer-readable storage medium for tangibly storing thereon program logic (e.g., see the back-end transactional component 113) for execution by the processor, the program logic having executable logic for performing the steps of method 600. For example, the program logic and/or the back-end transactional component 113 can have executable logic for communicating the odds feed to the affiliate app based on affiliate app's requests to show the odds module in the affiliate app's GUI. The program logic and/or the back-end transactional component 113 can have executable logic for, upon receiving consent and other user data from affiliate app, integrating a workflow of the affiliate app to process and verify user consent and other user data. The program logic and/or the back-end transactional component 113 can have executable logic for integrating a workflow of the affiliate app to generate a user account according to user account data received from the affiliate app. The program logic and/or the back-end transactional component 113 can have executable logic for integrating a workflow of the affiliate app to generate and place a bet according to bet and wallet data received from the affiliate app. The program logic and/or the back-end transactional component 113 can have executable logic for communicating bet updates to the affiliate app according to requests for such data from the affiliate app.

Having described components of the architecture example employed within the disclosed systems and methods, the components' operations with respect to the disclosed systems and methods will now be described below with reference to FIGS. 3A, 3B, 4, 5, and 6.

In some embodiments, there are different levels of integration. For example, at a first level, odds feed integration and simple redirect flow can occur in the affiliate app. E.g., see FIGS. 4, 5, and 6. At a second level, the affiliate app can be more integrated with functions that conventionally occur on the servers of a sports betting operator. E.g., see FIGS. 4 and 5. For example, on the second level, the affiliate app can integrate a bet slip which is then processed by the back-end transactional component of the operator but after the data is entered and saved via the affiliate app. E.g., see FIGS. 4, 5, and 6. These functions and levels can relate to a workflow of an integrated bet slip and environment for the affiliated app. E.g., see FIGS. 4, 5, and 6.

Figure 3A:
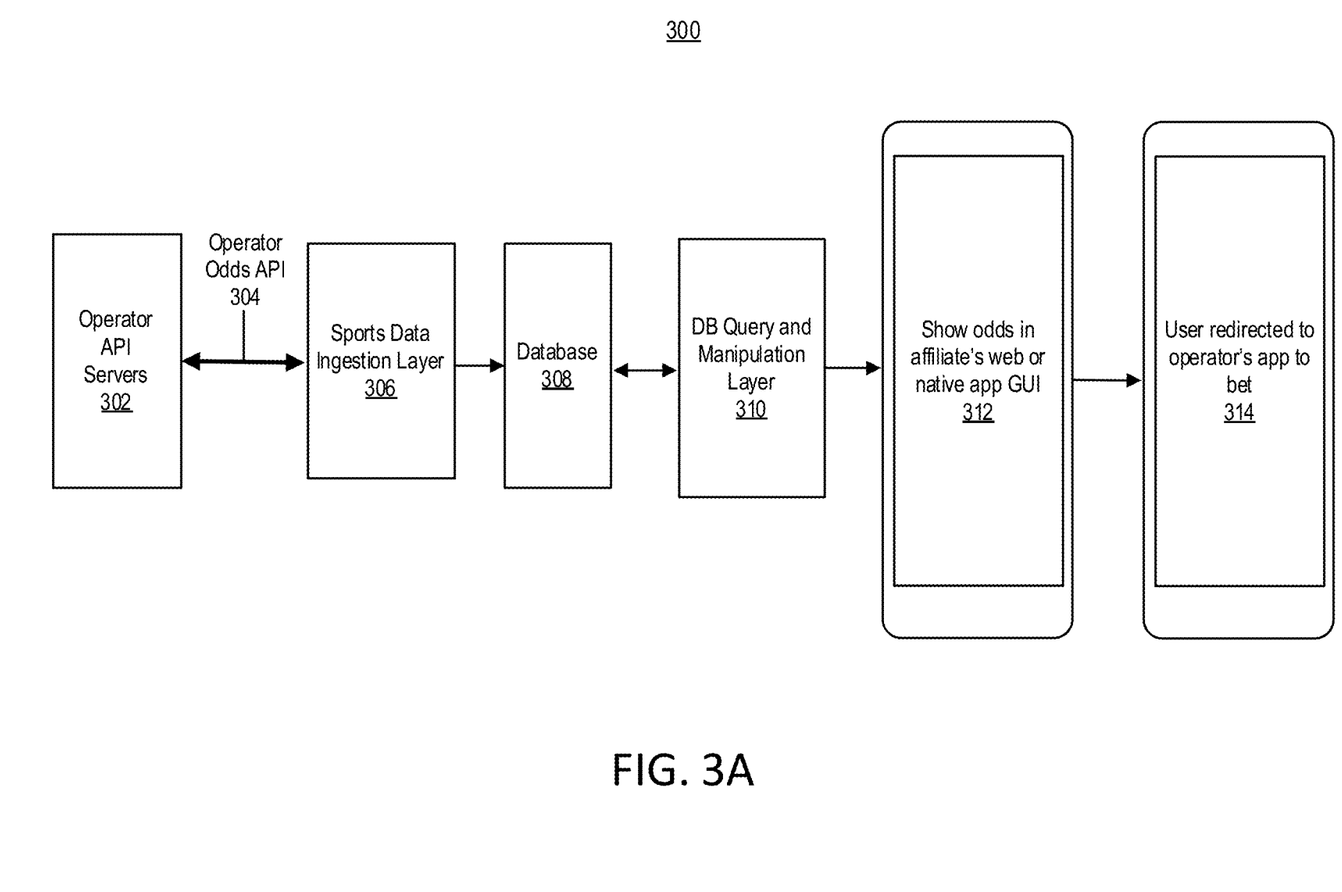
FIGS. 3A and 3B are schematic diagrams illustrating an example workflow, in accordance with some embodiments of the present disclosure.
Figure 3B:
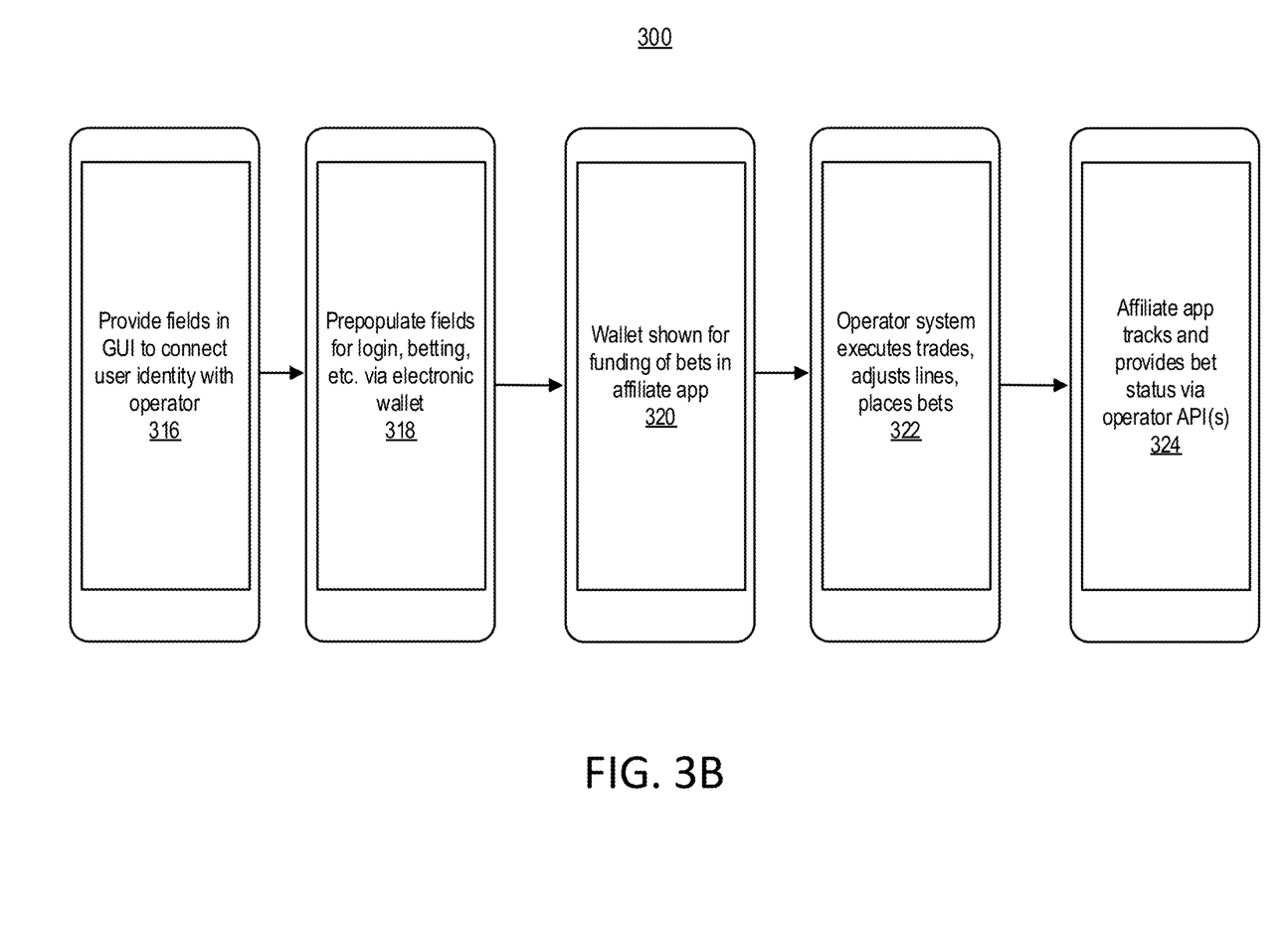

FIGS. 3A and 3B are schematic diagrams illustrating an example workflow 300, in accordance with some embodiments of the present disclosure. In FIG. 3A, the workflow 300 includes one or more operator API servers 302 communicating data via an operator odds API 304 with a sports data ingestion layer 306. The sports data ingestion layer 306 can ingest or preprocess the communicated data for sharing the data with the database 308, which can store, organize, manage, and share the ingested or preprocessed data. The database query and manipulation layer 310 of the workflow 300 can query information from the database 308 as well as update or change the data stored and organized by the database 308. An application of the affiliate, such as affiliate app 109, can use the database query and manipulation layer 310 to query information from the database 308 as well as update or change the data stored and organized by the database 308 via at least the servers and apps of the operator. A mobile device or computing device can show odds in the affiliate's web or native app graphical user interface (GUI) 312. Then, the mobile device or computing device can be redirected to operator's web or native app and/or backend component to place a bet according to one or more of the shown odds in a GUI 314.

In FIG. 3B, the workflow 300 includes the mobile device or computing device providing fields in a GUI 316 to connect user identity with the sports betting operator. With the GUI 316, OpenID workflow can be used to connect the user identity with the sports betting operator. The GUI 316 can occur after the odds are presented in the GUI 312 and redirection occurs in GUI 314, when the user has selected an interest in placing a bet. In GUI 318 of the affiliate app, fields for login, betting, and the like can be prepopulated. The prepopulating can occur via an electronic wallet of the affiliate application, and it can be shown via an iframe or a webview. In GUI 320 of the affiliate app, an electronic wallet of the app can be shown and/or used for funding of bets. In GUI 322, such as via an iframe or a webview, the sports betting operator's system can provide for executing trades, adjusting lines, and placing bets. In GUI 324, the affiliate app can track and provide bet status via one or more APIs of the sports betting operator.

Figure 4:
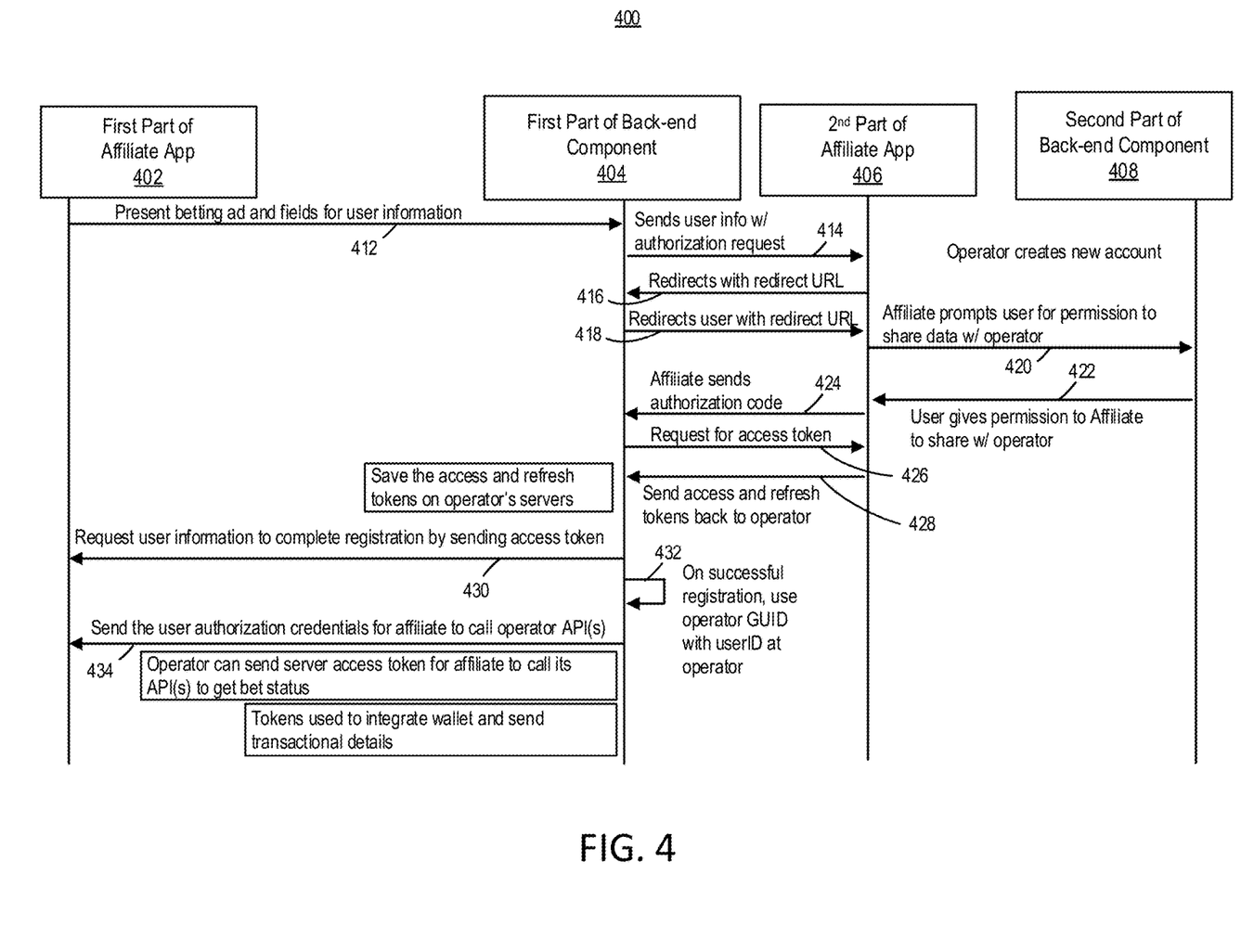
FIGS. 4, 5, and 6 are flowcharts illustrating example methods, in accordance with some embodiments of the present disclosure.

FIGS. 4, 5, and 6 are flowcharts illustrating example methods 400, 500, and 600 respectively, in accordance with some embodiments of the present disclosure.

In FIG. 4, the method 400 is shown being performed by a first part of an affiliate application 402 (e.g., see affiliate application 109 shown in FIGS. 1 and 2), a first part of a back-end transactional component 404 (e.g., see back-end transactional component 113), a second part of the affiliate application 406, and a second part of the back-end transactional component 408. The first part of the affiliate app 402 can include a GUI and related parts to promote betting, such as through displaying ads and odds. The first part of the affiliate app 402 can also include a GUI and related parts to provide wallet data, transactions data, and feedback on bets made. The first part of the back-end transactional component 404 can manage and facilitate authorization and credentials for interactions between the affiliate app and the back-end transactional component.

The second part of the affiliate application 406 can manage sharing user information retrieved by the affiliate application with the back-end transactional component. The second part of the affiliate application 406 can include a workflow, such as the OpenID connect flow, that allows for user content to be communicated between an affiliate app or website and the operator's back-end transactional component. The affiliate app or website can support the OpenID connect flow and can integrate it with the back-end transactional component of the operator. The operator can provide the integration of the workflow and make calls to APIs of the affiliate app or website to get the user data.

The second part of the back-end transactional component 408 can manage generation and use of a new user account for betting. And, bets and financial transactions can be made via the second part of the back-end transactional component 408.

As shown, the method 400 begins with the first part of the affiliate app 402 presenting a betting ad to a user, at step 412. If the user selects the ad, then the first part of the back-end transactional component 404 collects user information and credentials as well as an authorization request for betting. Then, the first part of the back-end transactional component 404 sends, to the second part of the affiliate app 406, the user information and credentials as well as the authorization request—at step 414.

At step 416, the second part of the affiliate app 406 redirects the user experience back to the first part of the back-end transactional component 404 to collect additional information from the user via the back-end transactional component. At step 418, the first part of the back-end transactional component 404 can then redirect the user experience back to the second part of the affiliate app 406. Redirection via steps 416 and 418 can occur via redirect URLs. Also, in these steps, OpenID can allow for user content to be communicated between an affiliate app or website and the operator's back-end transactional component. The OpenID and the operator can provide the integration of the workflow and make calls to APIs of the affiliate app or website to get the user data. Also, at step 420, the second part of the affiliate app 406 prompts the user for permission to share data with the operator. At step 422, the second part of the back-end transactional component 408 retrieves the permission if the user gives permission to the affiliate to share information with the operator. This can be managed via OpenID.

At step 424, the second part of the affiliate app 406 sends an authorization code according to the permission to the first part of the back-end transactional component 404. At step 426, the first part of the back-end transactional component 404 requests for an access token from the second part of the affiliate app 406. And, at step 428, the second part of the affiliate app 406 sends an access token and a refresh token back to the first part of the back-end transactional component 404. These steps can be managed via OpenID. Then, the access token and the refresh token can be saved on the operator's servers.

At step 430, the first part of the back-end transactional component 404 sends a request for additional user information from the first part of the affiliate app 402 to complete registration. The providing of the additional information is permitted by the first part of the affiliate app 402 due to the first part of the back-end transactional component 404 sending access tokens to the affiliate app.

At step 432, upon successful registration via the previously mentioned steps, the operator GUID and userID stored with the operator is used to complete authentication between the affiliate and the operator. This can be done via OpenID as well. And, then, at step 434, the first part of back-end transactional component 404 can send the user authorization credentials for the affiliate to call one or more operator APIs from the first part of the affiliate app 402. The operator can send server access token for affiliate to call its API(s) to get bet status. These mentioned tokens can be used to integrate an electronic wallet and send secured transactional details to the affiliate.

In FIG. 5, method 500 details steps performed by one or more computing devices (such as one or more of the computing devices described herein), in accordance with some embodiments of the present disclosure. Specifically, the steps of method 500 can be performed by a computing device having or running the affiliate application 109. In general, the steps are for integrating sports betting slips and environments for affiliates.

Method 500 begins with step 502, with an affiliate application (e.g., affiliate app 109) retrieving and receiving an odds feed from a back-end transactional component (e.g., back-end transactional component 113) of a sports betting operator in order to show an odds module in a graphical user interface (GUI) of the affiliate application. Step 502 can be a part of a shared step one. The shared step one includes operations by the affiliate app and the operator's back-end transactional component. The shared steps can be seen in FIG. 4 showing the flow to link the user account using a workflow of the affiliate app or website. The workflow can include OpenID Connect. The shared step one can include the affiliate retrieving the odds feed from the operator in order to show the odds module in either an app or website of the affiliate. In this step the affiliate can do the work to call operator APIs or retrieve a data feed from the operator that serves an odds module.

At step 504, the affiliate application receives user data via the GUI of the affiliate application. The user data can include user consent data and credentials of a user. Step 504 can be a part of a shared step two. The shared steps can be seen in FIG. 4 showing the flow to link the user account using a workflow of the affiliate app or website. The shared step two can include operations by the affiliate app and the operator's back-end transactional component. Shared step two can include a workflow, such as the OpenID connect work flow. The work flow can allow for user content to be communicated between an affiliate app or website and the operator's back-end transactional component. The affiliate app or website can support the OpenID connect flow and can integrate it with the back-end transactional component of the operator. The operate can provide the integration of the workflow and make calls to APIs of the affiliate app or website to get the user data.

At step 506, the affiliate application sends the user data to the back-end transactional component. Step 506 can be a part of a shared step two too.

At step 508, the affiliate application generates a user account according to user interaction with the GUI of the affiliate application. Step 508 can be a part of a shared step three. The shared steps can be seen in FIG. 4 showing the flow to link the user account using a workflow of the affiliate app or website. The shared step three includes operations by the affiliate app and the operator's back-end transactional component. Shared step three can include user account generation happening inside a webview or an iframe.

In some embodiments, for the affiliate component, webviews can be used as an alternative to iframes inside native mobile apps on iOS or Android. Iframes can be used to support the affiliate component via a web browser. The information that is provided into the iframe or webview depending on the implementation can be information that the affiliate has already inferred, received, or retrieved from a user (who could be a customer of the affiliate). The bet slip or environment in such examples can be pre-populated and the user only then needs to select or click to make a bet or buy or invest. Although all these steps can be implemented through the affiliate app or website, the finalization of the transactions and the holding of the funds must be controlled and performed by the servers of the sports betting operator. This is so the overall system is in regulatory compliance.

In some embodiments, for the affiliate app or website, the data accumulating from populating fields and clicks and other types of interactions by users over time allows the affiliate to build machine learning models that can more easily predict what bets customers are going to want to make, and to recalculate odds independent of the betting services in real-time so that the affiliate can assist customers in identifying which bets are undervalued or overvalued, which bets they prefer, etc.

In some embodiments, the affiliate uses iframes via a web browser and website to manage the registration and betting flow of the operator. Alternatively, the affiliate can use webview via a native app to manage the registration and betting flow of the operator. In such embodiments, the operator's system can call an API of the affiliate's system using the credentials received from a workflow such as OpenID flow. This process can be used to prepopulate a registration form or betting form. Also, artificial intelligence and/or machine learning can be used for pre-population of such forms.

At step 510, the affiliate application sends account data of the generated user account to the back-end transactional component. Step 510 can be a part of a shared step three too.

At step 512, the affiliate application generates a bet according to user interaction with an electronic wallet and the GUI of the affiliate application. And, at step 514, the affiliate application sends the bet to the back-end transactional component. The electronic wallet of the affiliate app can have functionally somewhat similar to a wallet, but it is in electronic and/or GUI form. Steps 512 and 514 can be parts of a shared step four. The shared steps can be seen in FIG. 4 showing the flow to link the user account using a workflow of the affiliate app or website. The shared step four can include operations by the affiliate app and the operator's back-end transactional component.

With shared step four, the user can connect to the affiliate app or website to place a bet. In this shared step the affiliate can open the electronic wallet to allow an operator to use the balance to place a bet. The operator can then integrate the electronic wallet as an allowed payment option to fund the bet. Also, this step is where the user can place the bet, which can be done via a webview or an iframe depending on the implementation or embodiment. The betting information is then communicated to the operator to finalize the bet accordingly using the workflow.

At step 516, the affiliate application tracks the bet via requesting and receiving communications of bet updates from the back-end transactional component. Step 516 can be a part of a shared step five. The shared steps can be seen in FIG. 4 showing the flow to link the user account using a workflow of the affiliate app or website. The workflow can include OpenID Connect. The shared step five can include operations by the affiliate app and the operator's back-end transactional component. With share step five, a user can track bet history from the affiliate app or website. In this step, the affiliate can call the API(s) of the operator to retrieve bet status information. The operator, in such an embodiment, can expose its API(s) to show status of a bet.

In FIG. 6, method 600 details steps performed by one or more computing devices (such as one or more of the computing devices described herein), in accordance with some embodiments of the present disclosure. Specifically, the steps of method 600 can be performed by a computing device having or running the back-end transactional component 113. In general, the steps are for integrating sports betting slips and environments for affiliates.

Method 600 begins with step 602, with a back-end transactional component of the sports betting operator (e.g., back-end transactional component 113) sending an odds feed to an affiliate application based on requests by the affiliate application to show an odds module in a graphical user interface (GUI) of the affiliate application. Step 602 can be part of the shared step one.

At step 604, the back-end transactional component integrates a workflow of the affiliate application to process and verify user data received from the affiliate application. The user data can include user consent data and credentials of a user. Step 604 can be part of the shared step two.

At step 606, the back-end transactional component further integrates the workflow of the affiliate application to generate a user account for the user according to the user data. Step 606 can be part of the shared step three.

At step 608, the back-end transactional component further integrates the workflow of the affiliate application to generate and place a bet for the user according to bet and wallet data associated with the user received from the affiliate application. Step 608 can be part of the shared step four.

At step 610, the back-end transactional component sends bet updates to the affiliate application according to requests for bet updates on the placed bet received from the affiliate application. Step 610 can be part of the shared step five.

With respect to the processes of FIGS. 5 and 6 as well as FIG. 4, a first computing device of a sports betting affiliate can execute the affiliate application. And, a second computing device of the sports betting operator can execute the back-end transactional component. The first computing device can be a part of a first local area network of the sports betting affiliate. And, the second computing device can be a part of a second local area network of the sports betting operator which is separate from the first local area network. And, the first computing device and the second computing device can be communicatively coupled via a wide area network including the first and second local area networks.

In some embodiments, the affiliate application can include a website, and the retrieving the odds feed from the back-end transactional component at step 502 can be via a first link in a first iframe of the web site. In such embodiments, the sending the user data to the back-end transactional component at step 506 can be via a second link in the first iframe or a second iframe of the web site. Also, the sending the account data of the generated user account to the back-end transactional component at step 510 can be via a third link in the first iframe, the second iframe, or a third iframe of the website. Further, the sending the bet to the back-end transactional component at step 514 can be via a fourth link in the first iframe, the second iframe, the third iframe, or a fourth iframe of the website. And, the tracking the bet via requesting and receiving communications of bet updates from the back-end transactional component at step 516 can be via a fifth link in the first iframe, the second iframe, the third iframe, the fourth iframe, or a fifth iframe of the website.

An iframe can be or include a HyperText Markup Language (HTML) element that allows a web browser window to be split into segments, each of which can show a different document. An iframe can lower bandwidth use, as repeating parts of a layout can be used in one frame, while variable content is displayed in another. Iframes can hold documents on different servers, and iframes can be used to display content (plugins) on third party websites as well as used to display banners on third party websites.

In some embodiments, the affiliate application can include a native application, and the retrieving the odds feed from the back-end transactional component at step 502 can be via a first link in a first webview of the native application. In such embodiments, the sending the user data to the back-end transactional component at step 506 can be via a second link in the first webview or a second webview of the native application. Also, the sending the account data of the generated user account to the back-end transactional component at step 510 can be via a third link in the first webview, the second webview, or a third webview of the native application. Further, the sending the bet to the back-end transactional component at step 514 can be via a fourth link in the first webview, the second webview, the third webview, or a fourth webview of the native application. And, the tracking the bet via requesting and receiving communications of bet updates from the back-end transactional component at step 516 can be via a fifth link in the first webview, the second webview, the third webview, the fourth webview, or a fifth webview of the native application.

A webview can be, or can include, a web browser that can be a part of a native application and that can be used to display web content without leaving the native app. The retrieving of the odds feed can occur via a view controller in the web browser, or the retrieving of the odds feed can occur via a custom tab in the web browser.

In some embodiments, a view controller or custom tabs can be used with webviews or web browsers. Any of the processes described herein that are performed via a web browser can be performed via a view controller or a custom tab in or executed via the web browser. In embodiments using a view controller, a user in the affiliate app can click on a link to start a betting registration process. The affiliate app can open a page inside a view controller. An example advantage of using a view controller can include an address bar of a browser showing a URL of the affiliate app. Also, a view controller can have phishing detection capabilities. And, a view controller can run as a separate process from the affiliate app which prevents access to private user data, such as cookies for the affiliate app. The view controller can also provide a continuous experience as it shares data with a web browser. If the user has logged in before and the session is still active, then the session can continue without requiring an additional login. And, with the view controller, the affiliate can monitor session times and require logins for inactive sessions. Users also can have access to data storage on remote storage devices (such as data storage on remote storage devices in a cloud computing environment). The access to data storage can be via a keychain, which can improve data security.

In embodiments using custom tabs, a user in the affiliate app can click on a link to start a betting registration process. The affiliate app can then open a page inside a customized tab in a web browser. The customized tab can be customized for the affiliate app specifically. For example, the tab can include visual design aspects similar to the affiliate app. An example advantage of using custom tabs can include an address bar of a browser showing a URL of the affiliate app. Also, custom tabs can warn users when they try to navigate to possible threat actor sites or download possible threat actor files. Custom tabs can also provide a continuous experience as such tabs can share cookies with a system of a web browser. If a user has logged in before and the session is still active, then the session continues without requiring additional login. Also, the affiliate app, via custom tabs, can monitor the session times and require logins for inactive sessions.

In some embodiments, a system having at least a first computing device of a sports betting affiliate and at least a second computing device of a sports betting operator can implement the methods 500 and 600 respectively (e.g., see system 100 shown in FIG. 1). The first computing device can include a first processor and a first non-transitory computer-readable storage medium for tangibly storing thereon first program logic for execution by the first processor (the first program logic being a part of an affiliate application of a sports betting affiliate). The first program logic can include executable logic for retrieving an odds feed from a back-end transactional component of a sports betting operator in order to show an odds module in a graphical user interface (GUI) of the affiliate application. The first program logic can include executable logic for receiving user data via the GUI of the affiliate application. The user data can include user consent data and credentials of a user. The first program logic can include executable logic for sending the user data to the back-end transactional component. The first program logic can include executable logic for generating a user account according to user interaction with the GUI of the affiliate application. The first program logic can include executable logic for sending account data of the generated user account to the back-end transactional component. The first program logic can include executable logic for generating a bet according to user interaction with an electronic wallet and the GUI of the affiliate application. The first program logic can include executable logic for sending the bet to the back-end transactional component. And, the first program logic can include executable logic for tracking the bet via requesting and receiving communications of bet updates from the back-end transactional component.

The second computing device can include a second processor and a second non-transitory computer-readable storage medium for tangibly storing thereon second program logic for execution by the second processor (the second program logic being a part of a back-end transactional component of a sports betting operator). The second computing device can include executable logic for sending an odds feed to an affiliate application based on requests by the affiliate application to show an odds module in a graphical user interface (GUI) of the affiliate application. The second computing device can include executable logic for integrating a workflow of the affiliate application to process and verify user data received from the affiliate application. The user data can include user consent data and credentials of a user (as mentioned). The second computing device can include executable logic for integrating the workflow of the affiliate application to generate a user account for the user according to the user data. The second computing device can include executable logic for integrating the workflow of the affiliate application to generate and place a bet for the user according to bet and wallet data associated with the user received from the affiliate application. And, the second computing device can include executable logic for sending bet updates to the affiliate application according to requests for bet updates on the placed bet received from the affiliate application.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module can be stored on a computer readable medium for execution by a processor. Modules can be integral to one or more servers, or be loaded and executed by one or more servers. One or more modules can be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure can be implemented in many manners and as such are not to be limited by the foregoing exemplary embodiments and examples. In other words, functional elements being performed by single or multiple components, in various combinations of hardware and software or firmware, and individual functions, can be distributed among software applications at either the client level or server level or both. In this regard, any number of the features of the different embodiments described herein can be combined into single or multiple embodiments, and alternate embodiments having fewer than, or more than, all of the features described herein are possible.

Functionality can also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that can be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications can be made to the elements and operations described above to obtain a result that remains within the scope of the systems and processes described in this disclosure.

What is claimed is:

1. A method comprising:
    retrieving over a computer network via a web browser, by an affiliate application of an affiliate, an odds feed from a back-end transactional component of a sports betting operator in order to show an odds module in a graphical user interface (GUI) of the affiliate application displayed via the web browser;
    receiving, by the affiliate application, user data via the GUI of the affiliate application, the user data comprising user consent data and credentials of a user;
    sending over the computer network via the web browser, by the affiliate application, the user data to the back-end transactional component to offload data processing of the user data to the back-end transactional component;
    generating, by the affiliate application, a user account according to user interaction with the GUI of the affiliate application;
    sending over the computer network via the web browser, by the affiliate application, account data of the generated user account to the back-end transactional component to offload data processing of the account data to the back-end transactional component;
    generating, by the affiliate application, a bet according to user interaction with an electronic wallet and the GUI of the affiliate application; and
    sending over the computer network via the web browser, by the affiliate application, the bet to the back-end transactional component to offload data processing of the bet to the back-end transactional component.

2. The method of claim 1, wherein the retrieving of the odds feed occurs via a view controller in the web browser.

3. The method of claim 1, wherein the retrieving of the odds feed occurs via a custom tab in the web browser.

4. The method of claim 1, further comprising:
    tracking through the computer network via the web browser, by the affiliate application, the bet via requesting and receiving communications of bet updates from the back-end transactional component.

5. The method of claim 4, wherein a first computing device of the sports betting affiliate executes the affiliate application, and wherein a second computing device of the sports betting operator executes the back-end transactional component.

6. The method of claim 5, wherein the first computing device is a part of a first local area network of the sports betting affiliate, wherein the second computing device is a part of a second local area network of the sports betting operator which is separate from the first local area network, and wherein the first computing device and the second computing device are communicatively coupled via a wide area network comprising the first and second local area networks.

7. The method of claim 4, wherein the affiliate application comprises a website, and wherein the retrieving the odds feed from the back-end transactional component is via a first link in an iframe of the website.

8. The method of claim 7, wherein the sending the user data to the back-end transactional component is via a second link in the iframe.

9. The method of claim 8, wherein the sending the account data of the generated user account to the back-end transactional component is via a third link in the iframe.

10. The method of claim 9, wherein the sending the bet to the back-end transactional component is via a fourth link in the iframe.

11. The method of claim 10, wherein the tracking the bet via requesting and receiving communications of bet updates from the back-end transactional component is via a fifth link in the iframe.

12. The method of claim 4, wherein the affiliate application comprises a native application, and wherein the retrieving the odds feed from the back-end transactional component is via a first link in a webview of the native application.

13. The method of claim 12, wherein the sending the user data to the back-end transactional component is via a second link in the webview.

14. The method of claim 13, wherein the sending the account data of the generated user account to the back-end transactional component is via a third link in the webview.

15. The method of claim 14, wherein the sending the bet to the back-end transactional component is via a fourth link in the webview.

16. The method of claim 15, wherein the tracking the bet via requesting and receiving communications of bet updates from the back-end transactional component is via a fifth link in the webview.

17. A non-transitory computer-readable storage medium tangibly encoded with computer-executable instructions, that when executed by a processor of computing device, performs a method, the method comprising:
    retrieving over a computer network via a web browser, by an affiliate application of an affiliate, an odds feed from a back-end transactional component of a sports betting operator in order to show an odds module in a graphical user interface (GUI) of the affiliate application displayed via the web browser;
    receiving, by the affiliate application, user data via the GUI of the affiliate application, the user data comprising user consent data and credentials of a user;
    sending over the computer network via the web browser, by the affiliate application, the user data to the back-end transactional component to offload data processing of the user data to the back-end transactional component;
    generating, by the affiliate application, a user account according to user interaction with the GUI of the affiliate application;
    sending over the computer network via the web browser, by the affiliate application, account data of the generated user account to the back-end transactional component to offload data processing of the account data to the back-end transactional component;
    generating, by the affiliate application, a bet according to user interaction with an electronic wallet and the GUI of the affiliate application; and sending over the computer network via the web browser, by the affiliate application, the bet to the back-end transactional component to offload data processing of the bet to the back-end transactional component.

* * * * *